United States Patent
Neidigk et al.

(10) Patent No.: US 10,968,942 B1
(45) Date of Patent: Apr. 6, 2021

(54) TAMPER-RESISTANT FASTENER

(71) Applicant: National Technology & Engineering Solutions of Sandia, LLC, Albuquerque, NM (US)

(72) Inventors: Stephen Neidigk, Albuquerque, NM (US); Zachary Medaris Wilson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 229 days.

(21) Appl. No.: 16/166,463

(22) Filed: Oct. 22, 2018

(51) Int. Cl.
*F16B 35/04* (2006.01)
*F16B 5/02* (2006.01)
*F16B 37/04* (2006.01)
*F16B 31/02* (2006.01)
*F16B 41/00* (2006.01)
*F16B 23/00* (2006.01)

(52) U.S. Cl.
CPC .......... *F16B 35/045* (2013.01); *F16B 5/0208* (2013.01); *F16B 23/0069* (2013.01); *F16B 31/021* (2013.01); *F16B 37/042* (2013.01); *F16B 41/005* (2013.01)

(58) Field of Classification Search
CPC ...... F16B 35/045; F16B 41/005; F16B 31/00; F16B 31/021; F16B 37/042; F16B 5/0208; F16B 23/0069; B25B 23/1415
USPC ........................................ 411/2, 3, 5; 81/471
See application file for complete search history.

(56) References Cited

U.S. PATENT DOCUMENTS

| | | | | | |
|---|---|---|---|---|---|
| 3,729,040 | A | * | 4/1973 | Whiteside | F16B 37/042 411/103 |
| 5,193,961 | A | * | 3/1993 | Hoyle | F16B 21/075 24/297 |
| 5,468,103 | A | * | 11/1995 | Leeson | F16B 1/0071 29/433 |
| 5,469,726 | A | * | 11/1995 | Rushing | E05B 73/0076 411/429 |
| 5,791,848 | A | * | 8/1998 | Lanham | F16B 37/14 411/373 |
| 6,062,787 | A | * | 5/2000 | Maddalena | B25B 13/485 411/373 |
| 6,261,042 | B1 | * | 7/2001 | Pratt | F16B 5/10 411/551 |

(Continued)

FOREIGN PATENT DOCUMENTS

GB 2067699 A * 7/1981 ............ F16B 41/005

*Primary Examiner* — Victor D Batson
*Assistant Examiner* — Amit Singh Dhillon
(74) *Attorney, Agent, or Firm* — Daniel J. Jenkins (57) ABSTRACT

A tamper-resistant threaded fastener including a circular head having a slot formed in the head transverse to the longitudinal axis, the slot having an enlarged region intermediate an apex and a base of the slot. A cap member includes a head having a drive feature formed therein, the head extending to a first shank portion, extending to an enlarged second shank portion, extending to a foot. The cap member is insertable in the slot only from a direction transverse to the longitudinal axis. During rotational installation of the fastener and cap member in a threaded counterbored opening for securing a barrier for protecting an asset, the foot shears inside the slot at a predetermined rotational drive force, the cap member being rotatable in the opening and protectively covering the fastener head.

20 Claims, 5 Drawing Sheets

(56) References Cited

U.S. PATENT DOCUMENTS

| | | | | |
|---|---|---|---|---|
| 7,252,470 | B1* | 8/2007 | Sanchez | B25B 13/485 |
| | | | | 301/35.621 |
| 9,239,072 | B1* | 1/2016 | Andersen | F16B 23/0069 |
| 2002/0003993 | A1* | 1/2002 | Ichimaru | F16B 21/075 |
| | | | | 411/325 |
| 2004/0148985 | A1* | 8/2004 | Swanson | F16B 41/005 |
| | | | | 70/225 |
| 2007/0092352 | A1* | 4/2007 | Nilsen | F16B 31/021 |
| | | | | 411/5 |
| 2017/0035485 | A1* | 2/2017 | Ivinson | B25B 23/141 |

* cited by examiner

TAMPER-RESISTANT FASTENER

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention relates to tamper-resistant fasteners, tamper-resistant systems and methods for providing tamper-resistance protection for an asset.

BACKGROUND OF THE INVENTION

Tamper-resistant fasteners are used in many physical security applications to delay an adversary during an attack of an asset. There is a need for tamper-resistant fasteners, tamper-resistant systems and methods of providing tamper-resistance protection for an asset.

SUMMARY OF THE INVENTION

In one embodiment, a tamper-resistant fastener includes a threaded fastener including a circular head and having a longitudinal axis, the fastener having a slot formed at least in the head transverse to the longitudinal axis, the slot extending from a base through an end of the head opposite a shank of the fastener at an apex of the slot, the slot having an enlarged region intermediate the apex and the base. The tamper-resistant fastener further includes a cap member having a second longitudinal axis and comprising a head having a drive feature formed therein, the head extending along the second axis to a first shank portion extending along the second longitudinal axis to an enlarged second shank portion extending along the second longitudinal axis to an end portion extending along the second longitudinal axis to a foot extending transverse to the second longitudinal axis. The cap member is insertable in the slot only from a direction transverse to the longitudinal axis, the head of the cap member extendable over the head of the fastener, the second shank portion receivable in the enlarged region, and the foot receivable in the slot between the enlarged region and the base. The tamper-resistant fastener further includes, in response to insertion of the cap member in the slot of the fastener, and the shank of the fastener alignedly positioned in a threaded counterbored opening for securing a barrier for protecting an asset, and application of a rotational drive force to the drive feature of the cap member, the foot abutting the slot and preventing rotation of the cap member relative to the slot, thereby urging the fastener to threadedly engage the opening until the end portion shearing at a predetermined rotational drive force, the cap member being rotatable in the opening and protectively covering the fastener head, the cap member not being removable from the slot in a direction away from the fastener along the longitudinal axis.

In another embodiment, a tamper-resistant system includes a threaded fastener including a circular head and having a longitudinal axis, the fastener having a slot formed at least in the head transverse to the longitudinal axis, the slot extending from a base through an end of the head opposite a shank of the fastener at an apex of the slot, the slot having an enlarged region intermediate the apex and the base. The tamper-resistant system further includes a cap member having a second longitudinal axis and comprising a head having a drive feature formed therein, the head extending along the second axis to a first shank portion extending along the second longitudinal axis to an enlarged second shank portion extending along the second longitudinal axis to an end portion extending along the second longitudinal axis to a foot extending transverse to the second longitudinal axis. The cap member is insertable in the slot only from a direction transverse to the longitudinal axis, the head of the cap member extendable over the head of the fastener, the second shank portion receivable in the enlarged region, and the foot receivable in the slot between the enlarged region and the base. The tamper-resistant system further includes a barrier for protecting an asset, and in response to insertion of the cap member in the slot of the fastener, and the shank of the fastener alignedly positioned in a threaded counterbored opening for securing the barrier, and application of a rotational drive force to the drive feature of the cap member, the foot abutting the slot and preventing rotation of the cap member relative to the slot, thereby urging the fastener to threadedly engage the opening until the end portion shearing at a predetermined rotational drive force, the cap member being rotatable in the opening and protectively covering the fastener head, the cap member not being removable from the slot in a direction away from the fastener along the longitudinal axis.

In a further embodiment, a method of providing tamper-resistance protection for an asset includes forming a slot at least in a circular head of a threaded fastener having a longitudinal axis, the slot extending from a base through an end of the head opposite a shank of the fastener at an apex of the slot, the slot having an enlarged region intermediate the apex and the base. The method further includes forming a cap member having a second longitudinal axis and comprising a head having a drive feature formed therein, the head extending along the second axis to a first shank portion extending along the second longitudinal axis to an enlarged second shank portion extending along the second longitudinal axis to an end portion extending along the second longitudinal axis to a foot extending transverse to the second longitudinal axis. The method further includes inserting the cap member in the slot, wherein the cap member is insertable in the slot only from a direction transverse to the longitudinal axis, the head of the cap member extending over the head of the fastener, the second shank portion received in the enlarged region, and the foot received in the slot between the enlarged region and the base. The method further includes alignedly positioning a shank of the fastener in a counterbored opening for securing a barrier for protecting an asset. The method further includes applying a rotational drive force to the drive feature of the cap member, the foot abutting the slot and preventing rotation of the cap member relative to the slot, thereby urging the fastener to threadedly engage the opening until the end portion shearing at a predetermined rotational drive force, the cap member being rotatable in the opening and protectively covering the fastener head, the cap member not being removable from the slot in a direction away from the fastener along the longitudinal axis.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The present invention is directed to a tamper-resistant fastener having a protective cap member that can only be installed in a slot formed in the fastener from a direction that is transverse to the axis of the fastener. Upon installation, the cap member, which is flush or recessed relative to a barrier surface and protectively covers the head of the fastener, also rotates relative to the fastener, making removal of the fastener more difficult and time-consuming.

Figures 1, 2, 3:
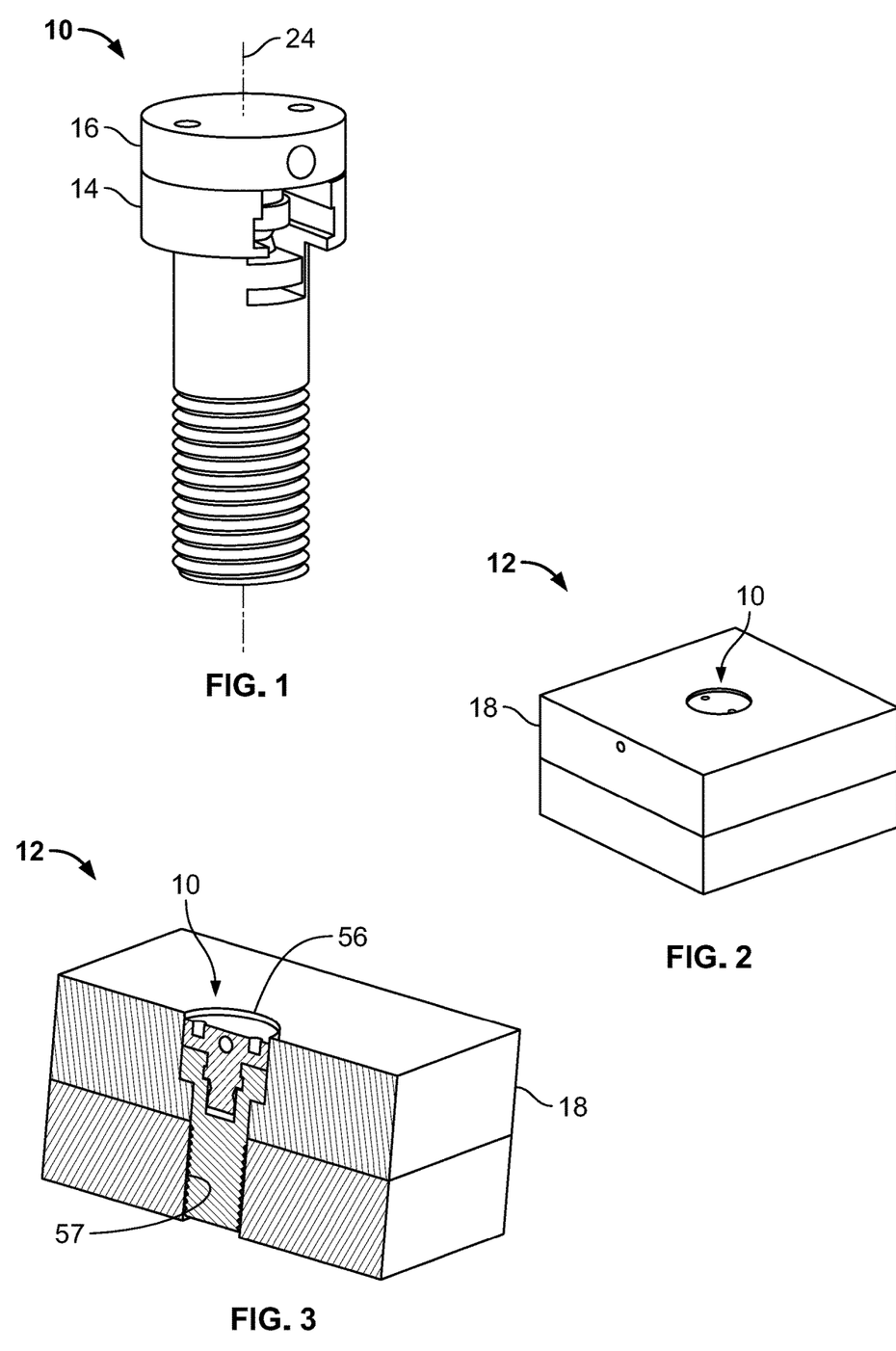
FIG. 1 is an upper perspective view of an exemplary tamper-resistant fastener according to an embodiment of the disclosure.
FIG. 2 is an upper perspective view of an exemplary tamper-resistant system according to an embodiment of the disclosure.
FIG. 3 is a cross-section of the tamper-resistant system of FIG. 2.
Figure 7:
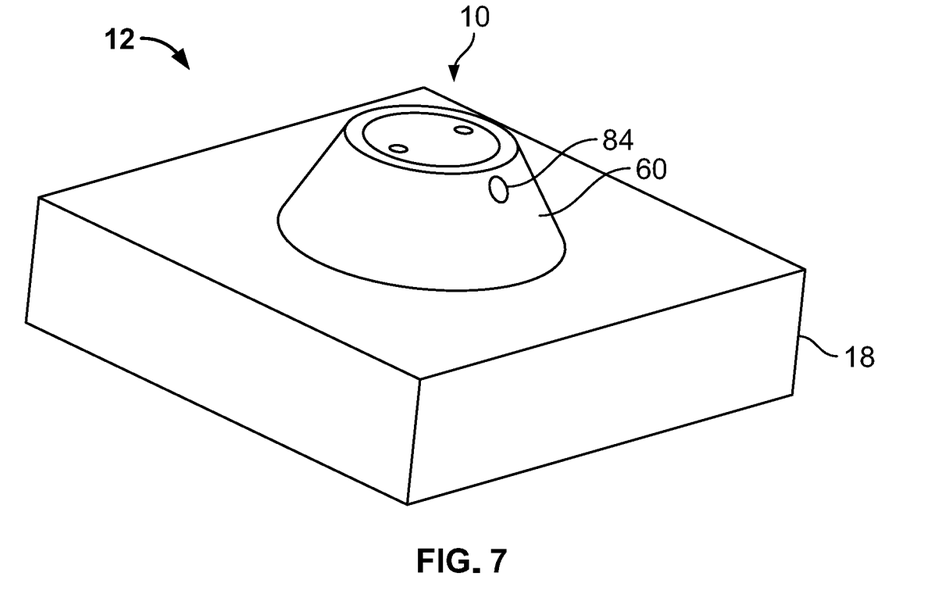
FIG. 7 is an upper perspective view of an exemplary tamper-resistant system according to an embodiment of the disclosure.
Figure 8:
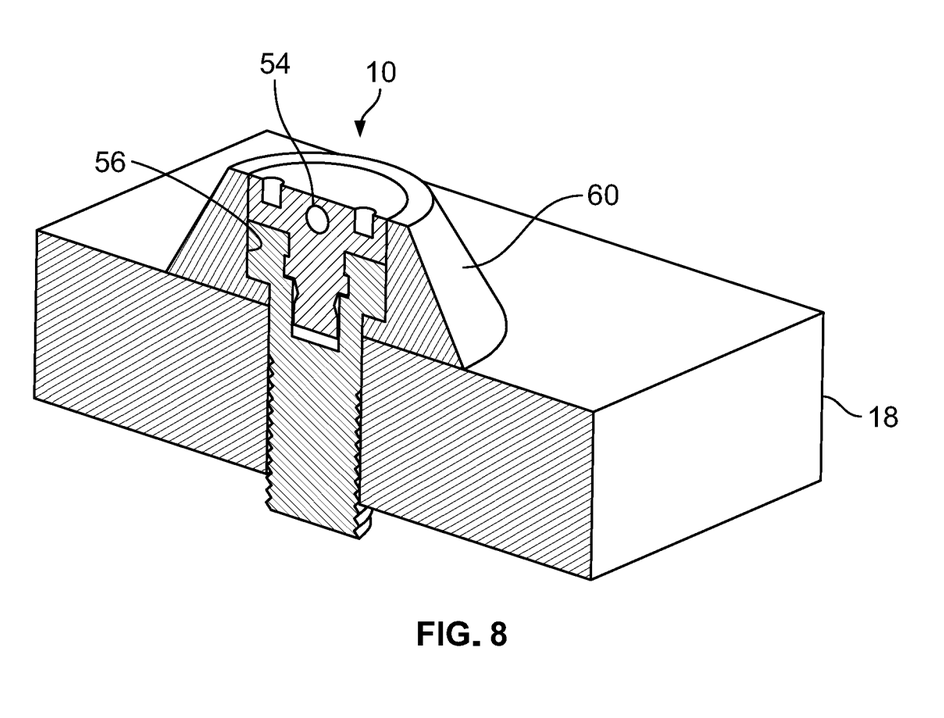
FIG. 8 is cross-section of the tamper-resistant system of FIG. 7.

FIG. 1 shows an exemplary tamper-resistant fastener 10 including a threaded fastener 14 further including a protective cap member 16 covering the head 20 (FIG. 4) of threaded fastener 14. As shown in FIG. 2, when installed in an exemplary threaded counterbored opening 56 (FIG. 3) formed in a barrier 18, tamper-resistant fastener 10 becomes a tamper-resistant system 12 for protecting an asset (not shown). FIG. 3 shows a cross-section of tamper-resistant system 12 of FIG. 2. That is, a counterbored portion of threaded counterbored opening 56 is formed in barrier 18, with a threaded portion 57 (FIG. 3) of threaded counterbored opening 56 formed in other structural member(s) such as plates positioned underneath barrier 18 such that when tamper-resistant fastener 10 is threadedly engaged with threaded portion 57 (FIG. 3) of threaded counterbored opening 56, as will be discussed in further detail below, barrier 18 is secured in position for protecting the asset (not shown). In an exemplary embodiment, as shown in FIG. 7, tamper-resistant fastener 12 may utilize a counterbored receiving member 60, in which the counterbored portion of threaded counterbored opening 56 (FIG. 8) is formed in the counterbored receiving member 60, and therefore not requiring the counterbored portion to be formed in an existing barrier 18, simplifying installation of tamper-resistant fastener 12 in barrier 18. For example, the thickness of barrier 18 may be of insufficient thickness to form a counterbore therein. In one embodiment, counterbored receiving member 60 resembles a truncated circular cone. Optionally, counterbored receiving member 60 includes a transverse opening 84 formed through both sides of counterbored receiving member 60, that when aligned with aperture 54 (FIG. 5) formed in cap member 16 (FIG. 5), permits a tamper-evident elongated member 80 (FIG. 10) to be inserted through aperture 54 (FIG. 5) and opening 84, as will be discussed in additional detail below.

For purposes herein, the term "counterbore," "counterbored" and the like is intended to also include all forms of recesses, such as countersinking, for receiving tamper-resistant fastener 10, so long as cap member 16 is essentially fully recessed in a barrier 18 or corresponding receiving member 60 for protecting cap member 16 from direct lateral access by attackers.

Figure 4:
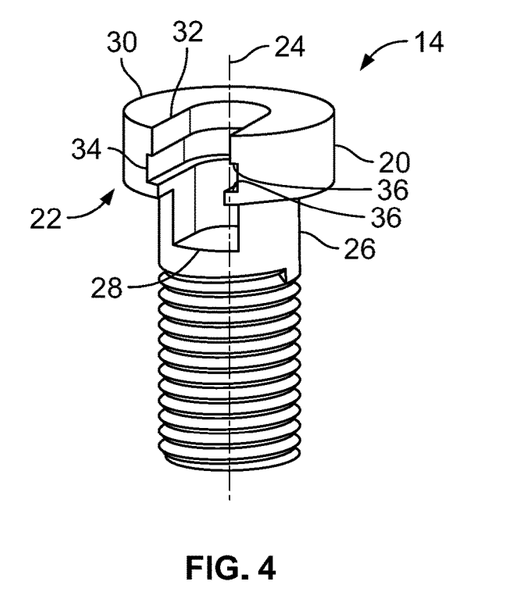
FIG. 4 is an enlarged upper perspective view of the tamper-resistant fastener of FIG. 1.
Figure 5:
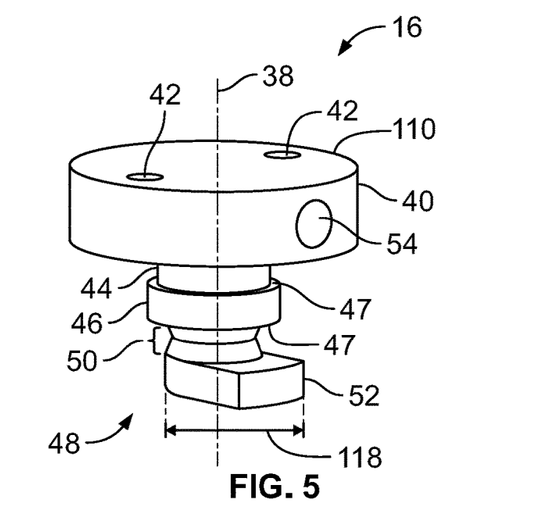
FIG. 5 is an upper perspective view of an exemplary cap member according to an embodiment of the disclosure.

FIG. 4 shows threaded fastener 14 having a longitudinal axis or axis 24. Threaded fastener 14 includes a circular head 20 extending along axis 24 to a threaded shank 26. A slot 22 is formed at least in head 20 in a direction transverse to axis 24 for receiving cap member 16 (FIG. 5). That is, slot 22 may extend not only through head 20 of threaded fastener 14, but may also extend into a portion of shank 26. As shown, slot 22 is formed at least partially through threaded fastener 14, such as to a center of threaded fastener 14 such that when cap member 16 (FIG. 5) is installed, a longitudinal axis or axis 38 (FIG. 5), axis 38 (FIG. 5) and axis 24 are coincident. In one embodiment, slot 22 may be laterally formed through threaded fastener 14. Slot 22 includes a base 28 formed in head 20 (or shank 26) and extends along axis 24 through an end 30 of head 20 opposite shank 26, defining an apex of slot 22. Slot 22 includes an enlarged region 34 formed intermediate apex 32 and base 28 for receiving a corresponding enlarged shank portion 46 (FIG. 5) of cap member 16 (FIG. 5). As shown, enlarged region 34 includes a pair of opposed shoulders 36 extending transverse to axis 24 engaging opposed shoulders 47 (FIG. 5) of corresponding enlarged shank portion 46 (FIG. 5) of cap member 16 (FIG. 5).

FIG. 5 shows cap member 16 having longitudinal axis or axis 38 and including a head 40 extending along axis 38 to a shank portion 44 which further extends along axis 38 to enlarged shank portion 46 that further extends along axis 38 to an end portion 48 that includes a shank portion 50 having a cross-sectional area that is less than shank portion 44. In one embodiment, shank portion 50 may define an inwardly tapered region. End portion 48 further includes a foot 52 extending transverse to axis 38. A drive feature 42 is formed in an end 110 facing away from shank portion 44, and is adapted to receive a corresponding drive feature 70 (FIG. 9) such as associated with a spanner wrench 68 (FIG. 9) having a hexagonal head 72 (FIG. 9) that is received by a conventional socket of a drive tool (not shown). In other embodiments, drive feature may be a square opening, a hexagonal opening, a slot, a one-way slot arrangement, such as an arrangement having alternately raised slot edges for engaging a blade screwdriver, a cruciform opening, a triangular opening, a pentagon, a star, a hexalobe, a tri-lobe, or combination thereof. In other words, any suitable feature corresponding to a drive tool suitable for urging cap member into driven rotational movement may be used. Head 40 includes an aperture formed in a direction transverse to axis 38 that extends through head 40 for receiving a tamper-evident elongated member 80 (FIG. 10) such as a fiber optic line or other similarly functioning elongated member as part of the tam per-resistant system.

Figure 6:
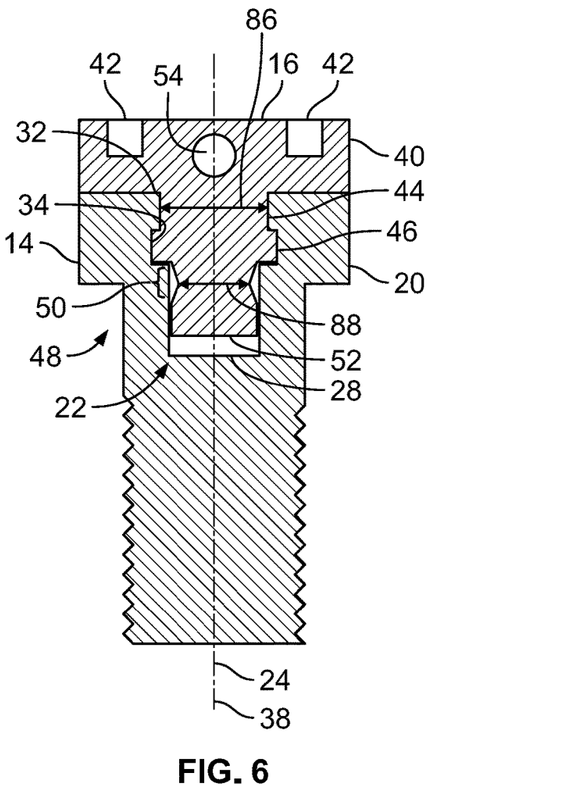
FIG. 6 is a cross-section of an installed tamper-resistant fastener and cap member of FIGS. 4 and 5, respectively, according to an embodiment of the disclosure.

As shown in FIG. 6, cap member 16 has been installed in slot 22 of threaded fastener 14. A diameter 86 of shank portion 44 of cap member 16 is greater than a minimum diameter 88 of shank portion 50 of end portion 48. The diameter of enlarged shank portion 46 of cap member 16 is larger than the diameter corresponding to apex 32 of slot 22. As a result, cap member 16 is only insertable in slot 22 from a direction transverse to axis 24 of threaded fastener 14. Also, as further shown in FIG. 6, the width of foot 52 is slightly less than the width of slot 22 to permit insertion of foot 52 in slot 22 between base 28 and enlarged region 34 of slot 22.

Continuing to refer to FIG. 6, once cap member 16 has been inserted in slot 22 of threaded fastener 14, drive feature 70 (FIG. 9) of spanner wrench 68 (FIG. 9) is inserted into corresponding drive feature 42 of cap member 16 and a rotational drive force 116 (FIG. 9) is applied. As a result of foot 52 having a length 118 (FIG. 5) greater than a width of slot 22 between base 28 and enlarged region 34, the transversely extending end of foot 52 abuts slot 22, preventing rotation of cap member 16 relative to slot 22, with rotational drive force 116 (FIG. 9) urging threaded fastener 14 into rotational movement relative to threaded counterbored opening 56 (FIG. 3), resulting in threaded fastener threadedly engaging threaded counterbored opening 56 (FIG. 3). At a predetermined rotational drive force 116 (FIG. 9), shank portion 50 of end portion 48 shears, separating end portion 48 from the rest of cap member 16. As a result of end portion 48 shearing, cap member 16 is freely rotatable in the non-threaded counterbored portion of threaded counterbored opening 56 (FIG. 3) about axis 24 of threaded fastener 14, with cap member 16 not being removable from slot 22 in a direction along axis 24. In one embodiment, end portion 48 may be sized such that either foot 52 or shank portion 50 may sheer at the predetermined rotational drive force 116 (FIG. 9).

Figure 9:
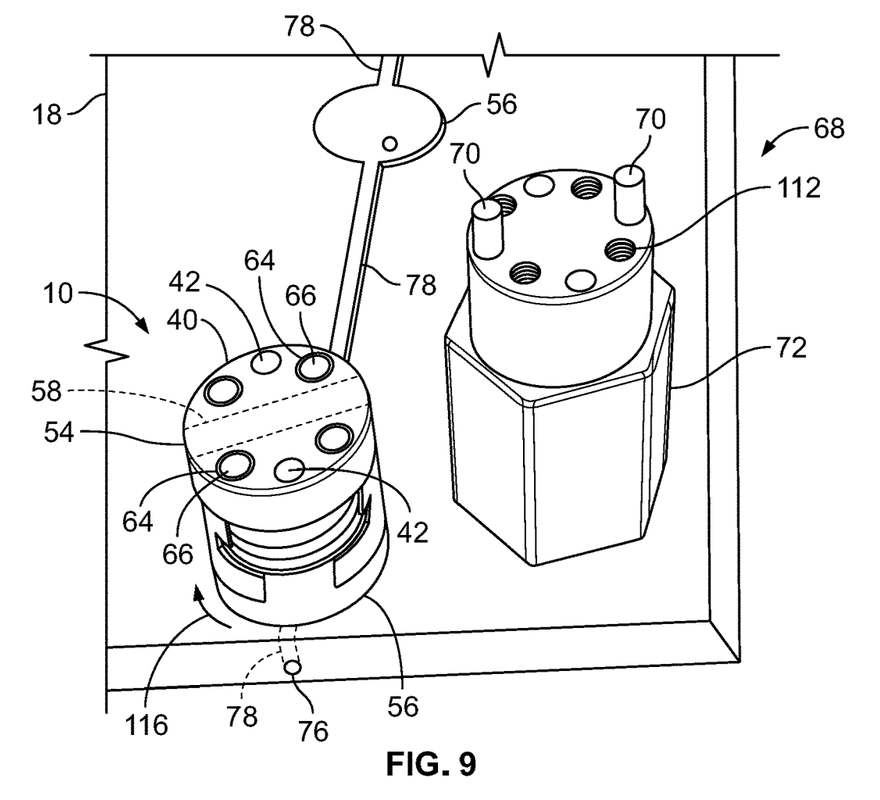
FIG. 9 is an upper perspective view of a partially installed exemplary tamper-resistant fastener beside an exemplary installation tool according to an embodiment of the disclosure.
Figure 10:
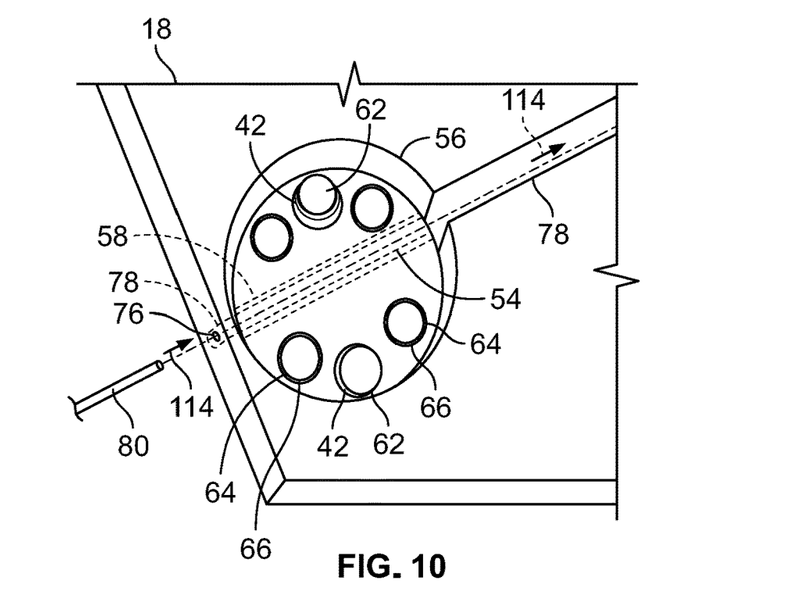
FIG. 10 is an upper perspective view of the installed tamper-resistant fastener of FIG. 9.

FIG. 9 shows tamper-resistant fastener 10 prior to threaded engagement in threaded counterbored opening 56. As further shown, head 40 includes aperture 54 extending through a central portion 58 of head 40 (for purposes of clarity, central portion 58 is shown in FIG. 10 and is intended to identify a portion of head 40 as viewed from a position vertically above head 40). In an attempt to force attackers to try to drill through central portion 58 of head 40, a plurality, such as four recesses 64 may be formed in head 40 along the periphery of head 40 that are not associated with drive feature 42, with the position of recesses 64 being outside of central portion 58 and not intersecting central portion 58 in a direction parallel with axis 38 (FIG. 5) with aperture 54 (FIG. 5) extending transverse to axis 38 (FIG. 5), and an insert 66 constructed of an extremely hard material such as: ceramics, metals, composites, a material having a Vickers hardness number of 500 HV, or combination thereof or other suitable material being non-removably inserted in each recess 64. Once tamper-resistant fastener 10 has been installed by spanner wrench 68 (noting that spanner wrench 68 includes a plurality of recesses 112 to receive protruding ends of corresponding inserts 66, permitting drive features 70 of spanner wrench 68 to drivingly engage corresponding drive features 42 of head 40 of cap member 16 (FIG. 6)), as shown in FIG. 10, additional inserts 62 are then non-removably inserted in drive feature 42.

As collectively shown in FIGS. 9-10, barrier 18 includes a receiving member 78 such as a slot, or receiving member may be an opening, such as opening 76 formed in an edge of barrier, which receiving member 76, 78 extending through opposed lateral portions of counterbored opening 56 for receiving tamper-evident elongated member 80 directed along an insertion path 114 through the receiving member 76 and aperture 54 of installed cap member 16 (FIG. 6).

Figure 11:
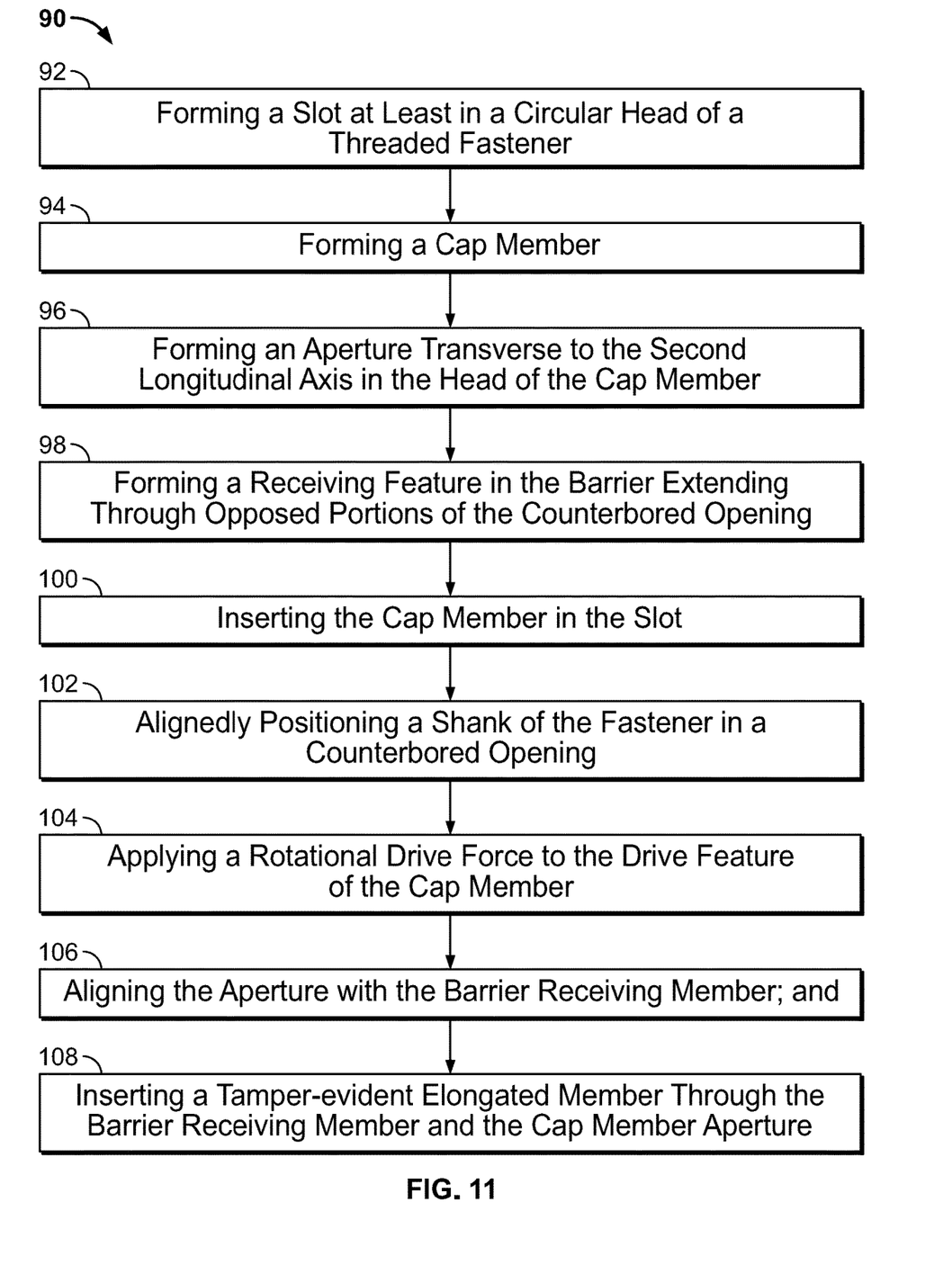
FIG. 11 shows an exemplary method of providing temper-resistance protection for an asset according to an embodiment of the disclosure.

FIG. 11 shows a method 90 of providing temper-resistance protection for an asset. Method 90 includes a step 92 of forming slot 22 at least in circular head 20 of threaded fastener 14 having axis 24, the slot 22 extending from base 28 through end 30 of head 40 opposite shank 26 of fastener 14 at apex 32 of slot 22, the slot 22 having enlarged region 34 intermediate apex 32 and base 28. Next, at step 94 the method provides forming cap member 16 having axis 38 and comprising head 40 having drive feature 42 formed therein, head 40 extending along axis 38 to shank portion 44 extending along axis 38 to enlarged second shank portion 46 extending along axis 38 to end portion 48 extending along axis 38 to foot 52 extending transverse to axis 38. Next, optionally at step 96, the method provides forming aperture 54 transverse to axis 38 in head 40 of cap member 16. Next, optionally at step 98, the method provides forming receiving feature 76 (or 78) in barrier 18 extending through opposed portions of counterbored opening 56. Next, at step 100, the method provides inserting cap member 16 in slot 22, wherein cap member 16 is insertable in slot 22 only from a direction transverse to axis 24, the head 40 of cap member 16 extending over head 20 of fastener 14, shank portion 46 received in enlarged region 34, and foot 52 received in slot 22 between enlarged region 34 and base 28. Next, at step 102, the method provides alignedly positioning shank 26 of fastener 14 in counterbored opening 56 for securing barrier 18 for protecting an asset. Next, at step 104, the method provides applying a rotational drive force 116 to drive feature 42 of cap member 16, foot 52 abutting slot 22 and preventing rotation of cap member 16 relative to slot 22, thereby urging fastener 14 to threadedly engage threaded portion 57 of opening 56 until end portion 48 shearing at a predetermined rotational drive force, cap member 16 being rotatable in opening 56 and protectively covering fastener head 20, cap member 16 not being removable from slot 22 in a direction away from fastener 14 along axis 24. Next, optionally at step 106, aligning aperture 54 with receiving feature 76 (or 78) in barrier 18. Then, optionally at step 108, inserting a tamper-evident elongated member 80 through one portion of the barrier receiving feature on one side of the counterbored opening, through the aperture of the cap member 16 installed in counterbored opening 56, and then through another portion of barrier receiving feature 76 (or 78) on the other side of the counterbored opening 56.

The present invention has been described as a tamper-resistant fastener, tamper-resistant system and method for providing tamper-resistance protection for an asset. It will be understood that the above description is merely illustrative of the applications of the principles of the present invention, the scope of which is to be determined by the claims viewed in light of the specification. Other variants and modifications of the invention will be apparent to those of skill in the art.

What is claimed is:

1. A tamper-resistant fastener, comprising:
    a threaded fastener including a head that is circular and having a first longitudinal axis, the threaded fastener having a slot formed at least in the head of the threaded fastener transverse to the first longitudinal axis, the slot extending from a base through an end of the head of the threaded fastener opposite a shank of the threaded fastener at an apex of the slot, the slot having an enlarged region intermediate the apex and the base; and a cap member having a second longitudinal axis and comprising a head having a drive feature formed therein, the head of the cap member extending along the second longitudinal axis to a first shank portion extending along the second longitudinal axis to an enlarged second shank portion extending along the second longitudinal axis to an end portion extending along the second longitudinal axis to a foot extending transverse to the second longitudinal axis;

wherein the cap member is insertable in the slot only from a direction transverse to the first longitudinal axis of the threaded fastener, the head of the cap member extendable over the head of the threaded fastener, the enlarged second shank portion receivable in the enlarged region, and the foot receivable in the slot between the enlarged region and the base;

wherein in response to insertion of the cap member in the slot of the threaded fastener, and the shank of the threaded fastener alignedly positioned in a threaded counterbored opening for securing a barrier for protecting an asset, and application of a rotational drive force to the drive feature of the cap member, the foot abutting the slot and preventing rotation of the cap member relative to the slot, thereby urging the threaded fastener to threadedly engage the threaded counterbored opening until the end portion shearing at a predetermined rotational drive force, the cap member being rotatable in the threaded counterbored opening and protectively covering the head of the threaded fastener, the cap member not being removable from the slot in a direction away from the threaded fastener along the first longitudinal axis of the threaded fastener.

2. The tamper-resistant fastener of claim 1, wherein the drive feature is taken from the group consisting of openings receivable by a spanner wrench, a square opening, a hexagonal opening, a slot, a one-way slot arrangement, a cruciform opening, a triangular opening, a pentagon, a star, a hexalobe, a tri-lobe, or combination thereof.

3. The tamper-resistant fastener of claim 1, wherein the head of the cap member includes an aperture transverse to the second longitudinal axis.

4. The tamper-resistant fastener of claim 3, wherein the aperture extends through a central portion of the head of the cap member.

5. The tamper-resistant fastener of claim 1 further comprises an insert for insertion in the drive feature.

6. The tamper-resistant fastener of claim 5, wherein the insert is composed of the group consisting of ceramics, metals, composites, material having a Vickers hardness number of 500 HV, or combination thereof.

7. The tamper-resistant fastener of claim 5 further comprises at least one additional insert positioned in a corresponding recess not associated with the drive feature.

8. The tamper-resistant fastener of claim 7, wherein the at least one additional insert does not intersect a centered portion of the head of the cap member in a direction parallel to the second longitudinal axis, the centered portion including an aperture formed in the head of the cap member transverse to the second longitudinal axis.

9. A tamper-resistant system, comprising:

a threaded fastener including a head that is circular and having a first longitudinal axis, the threaded fastener having a slot formed at least in the head of the threaded fastener transverse to the first longitudinal axis, the slot extending from a base through an end of the head of the threaded fastener opposite a shank of the threaded fastener at an apex of the slot, the slot having an enlarged region intermediate the apex and the base; and a cap member having a second longitudinal axis and comprising a head having a drive feature formed therein, the head of the cap member extending along the second longitudinal axis to a first shank portion extending along the second longitudinal axis to an enlarged second shank portion extending along the second longitudinal axis to an end portion extending along the second longitudinal axis to a foot extending transverse to the second longitudinal axis;

wherein the cap member is insertable in the slot only from a direction transverse to the first longitudinal axis of the threaded fastener, the head of the cap member extendable over the head of the threaded fastener, the enlarged second shank portion receivable in the enlarged region, and the foot receivable in the slot between the enlarged region and the base; and a barrier for protecting an asset;

wherein in response to insertion of the cap member in the slot of the threaded fastener, and the shank of the threaded fastener alignedly positioned in a threaded counterbored opening for securing the barrier, and application of a rotational drive force to the drive feature of the cap member, the foot abutting the slot and preventing rotation of the cap member relative to the slot, thereby urging the threaded fastener to threadedly engage the threaded counterbored opening until the end portion shearing at a predetermined rotational drive force, the cap member being rotatable in the threaded counterbored opening and protectively covering the head of the threaded fastener, the cap member not being removable from the slot in a direction away from the threaded fastener along the first longitudinal axis of the threaded fastener.

10. The tamper-resistant system of claim 9, wherein the head of the cap member includes an aperture transverse to the second longitudinal axis.

11. The tamper-resistant system of claim 10, wherein the aperture extends through a central portion of the head of the cap member.

12. The tamper-resistant system of claim 9 further comprises an insert for insertion in the drive feature.

13. The tamper-resistant system of claim 12 further comprises at least one additional insert positioned in a corresponding recess not associated with the drive feature.

14. The tamper-resistant system of claim 13, wherein the at least one additional insert does not intersect a centered portion of the head of the cap member in a direction parallel to the second longitudinal axis, the centered portion including an aperture formed in the head of the cap member transverse to the second longitudinal axis.

15. The tamper-resistant system of claim 9, wherein a counterbored portion of the threaded counterbored opening is formed in a counterbored receiving member overlying a remaining portion of the threaded counterbored opening.

16. The tamper-resistant system of claim 15, wherein the counterbored receiving member resembles a truncated circular cone.

17. The tamper-resistant system of claim 10, wherein the barrier includes a receiving feature extending through opposed lateral portions of the threaded counterbored opening for receiving a tamper-evident elongated member through the receiving feature of the barrier and the aperture of the inserted cap member.

18. The tamper-resistant system of claim 17, wherein the receiving feature extends through opposed lateral portions of at least two threaded counterbored openings for receiving the tamper-evident elongated member through at least two cap members of two correspondingly installed cap members and fasteners, and the receiving feature of the barrier.

19. A method of providing tamper-resistance protection for an asset, comprising:

provinding a threaded fastener with a slot at least in a head of the threaded fastener, wherein the head of the threaded fastener is circular and the fastener having a first longitudinal axis, the slot extending from a base through an end of the head of the threaded fastener opposite a shank of the threaded fastener at an apex of the slot, the slot having an enlarged region intermediate the apex and the base;

providing a cap member having a second longitudinal axis and comprising a head having a drive feature formed therein, the head of the cap member extending along the second longitudinal axis to a first shank portion extending along the second longitudinal axis to an enlarged second shank portion extending along the second longitudinal axis to an end portion extending along the second longitudinal axis to a foot extending transverse to the second longitudinal axis;

inserting the cap member in the slot, wherein the cap member is insertable in the slot only from a direction transverse to the first longitudinal axis of the threaded fastener, the head of the cap member extending over the head of the threaded fastener, the enlarged second shank portion received in the enlarged region, and the foot received in the slot between the enlarged region and the base;

alignedly positioning a shank of the threaded fastener in a counterbored opening for securing a barrier for protecting an asset; and applying a rotational drive force to the drive feature of the cap member, the foot abutting the slot and preventing rotation of the cap member relative to the slot, thereby urging the threaded fastener to threadedly engage the counterbored opening until the end portion shearing at a predetermined rotational drive force, the cap member being rotatable in the counterbored opening and protectively covering the head of the threaded fastener, the cap member not being removable from the slot in a direction away from the threaded fastener along the first longitudinal axis of the threaded fastener.

20. The method of claim 19 further comprises, after the step of providing the cap member, providing an aperture transverse to the second longitudinal axis in the head of the cap member;

providing the barrier with a receiving feature extending through opposed portions of the counterbored opening;

after the step of applying a rotational force to the drive feature, aligning the aperture with the receiving feature; and inserting a tamper-evident elongated member through one portion of the receiving feature on one side of the counterbored opening, through the aperture of the cap member inserted in the counterbored opening, and then through another portion of the receiving feature on other side of the counterbored opening.

* * * * *